US012652491B2

(12) United States Patent　　　　(10) Patent No.:　US 12,652,491 B2
Smith et al.　　　　　　　　　　　　(45) Date of Patent:　　　　Jun. 9, 2026

(54) GENERATING AUDIO AND HAPTICS OUTPUT FROM A COMMON ACTUATOR

(71) Applicant: Cirrus Logic International Semiconductor Ltd., Edinburgh (GB)

(72) Inventors: James R. Smith, Austin, TX (US); Nicholas J. Skinner, Southhamptom (GB); Charles D. Smyth, III, Austin, TX (US); Graham C. Curtis, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 138 days.

(21) Appl. No.: 18/390,219

(22) Filed: Dec. 20, 2023

(65) Prior Publication Data

US 2025/0008264 A1　　Jan. 2, 2025

Related U.S. Application Data

(60) Provisional application No. 63/510,664, filed on Jun. 28, 2023.

(51) Int. Cl.
　　　*H04R 3/04*　　　　(2006.01)
　　　*G06F 3/01*　　　　(2006.01)
　　　*G06F 3/16*　　　　(2006.01)
(52) U.S. Cl.
　　　CPC ............... *H04R 3/04* (2013.01); *G06F 3/016* (2013.01); *G06F 3/165* (2013.01)
(58) Field of Classification Search
　　　CPC ............ H04R 3/04; G06F 3/016; G06F 3/165

USPC .............................................. 381/55, 59, 96
　　　See application file for complete search history.

(56)　　　　　　　References Cited

U.S. PATENT DOCUMENTS

| | | | | |
|---|---|---|---|---|
| 10,969,871 | B2 * | 4/2021 | Rand ...................... | G06F 3/016 |
| 11,269,415 | B2 * | 3/2022 | Harvey ................. | G06F 3/0412 |
| 11,500,469 | B2 * | 11/2022 | Rao .......................... | G06F 3/016 |
| 11,812,218 | B1 | 11/2023 | Clarkin et al. | |
| 12,190,716 | B2 * | 1/2025 | Doy .......................... | G08B 6/00 |
| 2020/0218352 | A1 * | 7/2020 | Macours ................. | H04R 3/04 |
| 2023/0059333 | A1 | 2/2023 | Lal et al. | |

FOREIGN PATENT DOCUMENTS

| | | | |
|---|---|---|---|
| EP | 3677996 A1 | 7/2020 | |
| EP | 3748474 A1 * | 9/2020 | ............... H04R 9/06 |

OTHER PUBLICATIONS

International Search Report and Written Opinion of the International Searching Authority, International Application No. PCT/GB2024/051638, mailed Sep. 10, 2024.

* cited by examiner

*Primary Examiner* — Xu Mei

(74) *Attorney, Agent, or Firm* — Jackson Walker L.L.P.

(57)　　　　　　　ABSTRACT

A haptic driver for driving a haptic actuator, the haptic driver configured to: provide a haptic drive signal and an audio drive signal, the haptic drive signal for causing the haptic actuator to generate a haptic vibration output and the audio drive signal for causing the haptic actuator to generate an audio output; and drive the haptic actuator with the haptic drive signal and the audio drive signal so that the haptic actuator generates the haptic vibration output and the audio output.

16 Claims, 7 Drawing Sheets

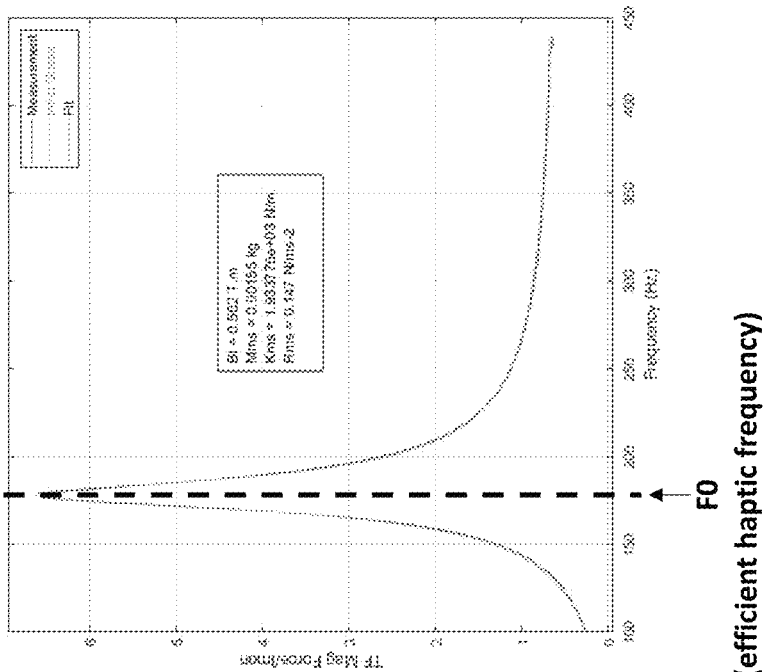
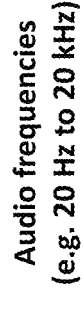
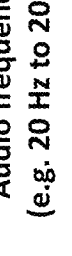
F0
(efficient haptic frequency)
Audio frequencies
(e.g. 20 Hz to 20 kHz)
FIGURE 1

| | Input Signal - External - | Input Signal - Internal - | Filtering | Conversion | (Processing) | Component Drive Signals | Combined Drive Signal |
|---|---|---|---|---|---|---|---|
| A1 | Audio | - | (HPF) | - | - | Audio | Audio-Haptic |
| | Haptic | - | (LPF) | - | - | Haptic | |
| A2 | Audio | - | HPF | - | Buffering | Audio | Audio-Haptic |
| | | - | LPF | A2H | Haptic | Haptic | |
| A3 | Haptic | - | (HPF) | H2A | Buffering | Audio | Audio-Haptic |
| | | - | (LPF) | - | Haptic | Haptic | |
| A4 | (Command) | Audio | (HPF) | - | - | Audio | Audio-Haptic |
| | (Command) | Haptic | (LPF) | - | - | Haptic | |
| A5 | (Command) | Audio | (HPF) | - | Buffering | Audio | Audio-Haptic |
| | (Command) | | (LPF) | A2H | Haptic | Haptic | |
| A6 | (Command) | Haptic | (HPF) | H2A | Buffering | Audio | Audio-Haptic |
| | (Command) | | (LPF) | - | Haptic | Haptic | |
| A7 | Audio | - | (HPF) | - | - | Audio | Audio-Haptic |
| | (Command) | Haptic | (LPF) | - | - | Haptic | |

FIGURE 3

AUDIO
DRIVE SIGNAL

HAPTIC
DRIVE SIGNAL

AUDIO-HAPTIC
DRIVE SIGNAL

GENERATING AUDIO AND HAPTICS OUTPUT FROM A COMMON ACTUATOR

FIELD OF DISCLOSURE

The present disclosure relates to generation of audio and haptics from a common actuator. In particular, the present disclosure relates to haptic drivers, haptic systems comprising the same and related methods, for driving one or more haptic actuators to generate a haptic vibration output and an audio output.

BACKGROUND

As is well known, haptic (or haptics) technology creates an experience of touch, or a tactile experience, by applying forces, vibrations, or motions to a user. Using a haptic transducer or haptic actuator, as a type of vibrational transducer, forces may be applied to the user to give a haptic experience (also referred to as haptic feedback) which accompanies and/or enhances another user experience, such as an audio or visual experience, or which merely provides the user with tactile information concerning the status of an ongoing process.

Example haptic actuators include: linear resonant actuators (LRAs), which are highly power efficient when operated in a narrow band at or near resonance; voice coil motors (VCMs) or voice coil actuators (VCAs), which are similar to LRAs but have a broader frequency response; and eccentric rotating-mass motors (ERMs) which are typically much slower than LRAs and VCMs/VCAs and are well suited to rumble-type—or other low-frequency—haptic feedback. Haptic vibrations can provide added immersion in gaming applications, for example.

Audio transducers, such as speakers, are also well known. Audio technology creates an audio experience for a user.

Typical audio-haptic applications, where both haptic (touch-based) and audio (audible sound) user experiences are desired, employ both haptic and audio transducers.

It is desirable to reduce costs and system board area for such audio-haptic applications.

SUMMARY

According to a first aspect of the present disclosure, there is provided a haptic driver for driving a haptic actuator, the haptic driver configured to: provide (or generate) a haptic drive signal and an audio drive signal, the haptic drive signal for causing the haptic actuator to generate a haptic vibration output and the audio drive signal for causing the haptic actuator to generate an audio output; and drive the haptic actuator with the haptic drive signal and the audio drive signal so that the haptic actuator generates the haptic vibration output and the audio output.

According to a second aspect of the present disclosure, there is provided an integrated circuit, such as an IC chip, comprising the haptic driver of the aforementioned first aspect.

According to a third aspect of the present disclosure, there is provided a haptic system or host device, comprising: the haptic driver of the aforementioned first aspect; and the haptic actuator or haptic actuators.

According to a fourth aspect of the present disclosure, there is provided a haptic system, comprising: a haptic actuator; and a haptic driver, wherein the haptic driver is configured to: provide (or generate) a drive signal comprising a haptic component and an audio component, the haptic component for causing the haptic actuator to generate a haptic vibration output and the audio component for causing the haptic actuator to generate an audio output; and drive the haptic actuator with the drive signal so that the haptic actuator generates the haptic vibration output and the audio output.

According to a fifth aspect of the present disclosure, there is provided a haptic system, comprising: a haptic actuator; and a haptic driver, wherein the haptic driver is configured to: provide (or generate) an audio-haptic drive signal comprising a haptic drive signal and an audio drive signal, the haptic drive signal for causing the haptic actuator to generate a haptic vibration output and the audio drive signal for causing the haptic actuator to generate an audio output; and drive the haptic actuator with the drive signal so that the haptic actuator generates the haptic vibration output and the audio output.

According to a sixth aspect of the present disclosure, there is provided a haptic system, comprising: a plurality of haptic actuators; and a haptic driver, wherein the haptic driver is configured to: for each haptic actuator, provide (or generate) a haptic drive signal and an audio drive signal, the haptic drive signal for causing the haptic actuator to generate a haptic vibration output and the audio drive signal for causing the haptic actuator to generate an audio output; and drive the haptic actuators with their respective haptic drive signals and audio drive signals so that the haptic actuators generate their respective haptic vibration outputs and audio outputs. The audio drive signals may be configured so that the haptic actuators collectively generate stereo or multi-channel or panning (directional or changing direction over time) audio outputs. The haptic drive signals may be configured so that the haptic actuators collectively generate stereo or multi-channel or panning haptic vibration outputs.

Corresponding apparatus/device aspects, method aspects, computer program aspects and storage medium aspects are envisaged. Features of one aspect may be applied to another and vice versa.

BRIEF DESCRIPTION OF THE DRAWINGS

Reference will now be made, by way of example only, to the accompanying drawings, of which:

FIG. 1 is a graph showing an example frequency response of an LRA;

FIG. 3 is a table useful for understanding a number of example arrangements of the haptic driver of FIG. 2;

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

As mentioned above, it is desirable to reduce costs and system board area for audio-haptic applications, where both haptic (touch-based) and audio (audible sound) user experiences are desired. One way to reduce such costs is to use or re-use the haptic actuator as an audio transducer, for example as a speaker for alerts.

Taking LRAs as an example haptic actuator, FIG. 1 is a graph showing an example frequency response of an LRA, showing a distinctive 'sharp' resonant peak at its resonant frequency F0, in this example at around 180 Hz. Haptic actuators efficiently provide a haptic output at or around the resonant frequency F0. Across a wide frequency range, and in particular at higher frequencies, an LRA can also act as a low fidelity speaker. Audio content can cover a range of 20 Hz to 20 kHz, although an LRA would generally only operate as a practical speaker across part of this range.

Similar considerations apply to VCAs and VCMs. VCAs for example will vibrate at a range of frequencies, for example between 50-400 Hz, depending on the range of the specific actuator. ERMs may be used to create audible sound in some limited situations.

Looking at FIG. 1 as an example, it can be appreciated that playing mixed audio and haptic content might potentially cause haptics to output when not intended. That is, audio frequencies at or around the resonant frequency F0 may cause noticeable haptic vibration to occur. Similarly, it may be that some haptic content causes noticeable audio to be output.

It is preferable that any audio generated by a haptic actuator does not cause noticeable haptic vibration, and also that any haptic vibrations do not cause noticeable audio. Algorithms are considered herein which enable audio and haptics signals to be output to or mixed onto the same actuator, substantially without impacting each other's operation.

Figure 2:
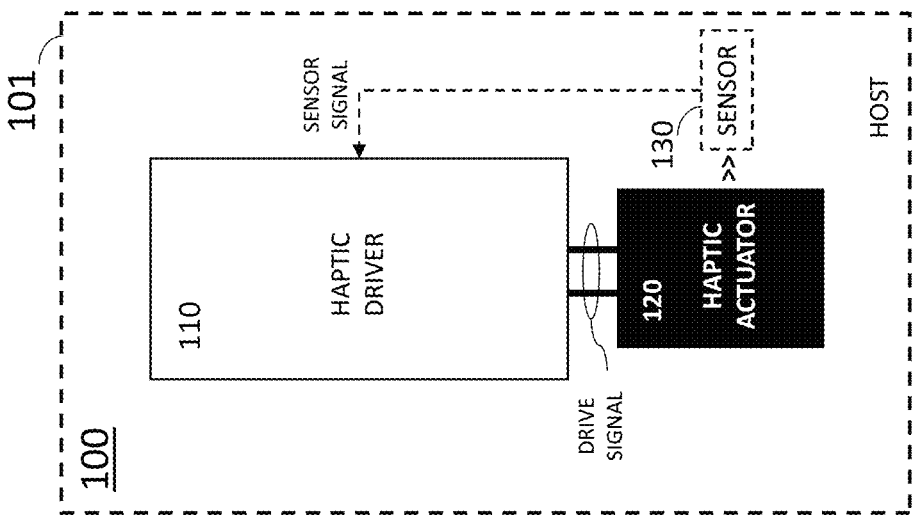
FIG. 2 is a schematic diagram of a host and haptic driver embodying the present invention.

FIG. 2 is a schematic diagram of a host 100, embodying the present invention. The host 100 may be considered a host system or a host device but will be referred to simply as a host for simplicity. The present disclosure will be understood accordingly.

The host 100 may be referred to as a haptic-enabled host and may be a consumer device or system. Examples of such devices and systems include electrical or electronic devices (which may be portable devices), such as cellphones, laptops, tablet computers, wearable electronic devices, power tools, gaming controllers and automotive systems. Example automotive systems include a seat, seatback, headrest, handle, in-vehicle console, gearstick and steering wheel.

As shown in FIG. 2, the host 100 may comprise an enclosure 101, a haptic driver 110, a haptic actuator 120 and, optionally, a sensor 130. The host 100 may be provided without the haptic actuator 120 and be fitted with the haptic actuator 120 subsequently. The haptic driver 110 may be provided independently of the host 100, for example to be fitted during manufacture of the host 100.

The enclosure 101 may comprise any suitable housing, casing, chassis or other enclosure for housing the various components of the host 100. Enclosure 101 may be constructed from plastic, metal, fabric and/or any other suitable materials. In addition, enclosure 101 may in some arrangements be adapted (e.g., sized and shaped) such that host 100 is readily useable by a user (i.e. a person, a consumer).

The haptic driver 110 may be or comprise a controller, signal generator and/or amplifier. The haptic driver 110 is configured to drive the haptic actuator 120 with a drive signal (or plurality of drive signals), as indicated. The haptic driver 110 may be implemented as an integrated circuit, optionally as part or all of an IC chip, or as a plurality of integrated circuits in combination.

In overview, the haptic driver 110 is configured to generate (or provide) a haptic drive signal and an audio drive signal, the haptic drive signal for causing the haptic actuator 120 to generate a haptic vibration output and the audio drive signal for causing the haptic actuator 120 to generate an audio output. The haptic driver 110 is thus configured to drive the haptic actuator 120 with the haptic drive signal and the audio drive signal so that the haptic actuator 120 generates the haptic vibration output and the audio output.

In arrangements, it may be that the haptic drive signal and the audio drive signal are configured to cause the haptic actuator 120 to generate the haptic vibration output and the audio output at the same time and/or at different times. For example, it may be that a noticeable audio output (for detection by human hearing) occurs at the same time, or at a different time from, a noticeable haptic vibration output (for detection by human touch), depending on the information content of the haptic drive signal and the audio drive signal.

The haptic drive signal and the audio drive signal may be component parts of an audio-haptic drive signal, i.e. a combined signal, and the haptic driver 110 may be configured to drive the haptic actuator 120 with the audio-haptic drive signal. For example, the haptic driver 110 may be configured to combine the haptic drive signal and the audio drive signal to generate the audio-haptic drive signal. The haptic driver 110 may be configured to generate the audio-haptic drive signal directly, but that signal may nevertheless be understood to be a combination of, or to comprise, a haptic drive signal and an audio drive signal. For ease of understanding, the haptic drive signal and the audio drive signal will be referred to herein individually, although it will be understood that they may be components of a combined signal.

The haptic driver 110 may be provided as a combination of a signal generator (e.g. digital signal processor, DSP, as explained later) and a haptic driver output stage (e.g. performing signal amplification). Such a signal generator may generate the haptic drive signal and the audio drive signal, and the haptic driver output stage may be coupled to the haptic actuator 120 and output those signals (or the audio-haptic drive signal) in amplified form. The present disclosure will be understood accordingly.

The haptic actuator 120 (or simply, actuator or transducer) may be or comprise an LRA, a VCM, a VCA and/or an ERM. The haptic actuator 120 may be implemented as a plurality of actual haptic actuators in some arrangements. In line with FIG. 1, a gain from driving signal to haptic actuator response at audio frequencies above e.g. 700 Hz or 1000 Hz may be A times lower than at F0, where A>2, optionally where A>5, optionally where A>10.

The haptic driver 110 may be housed within enclosure 101 and may include any system, device, or apparatus configured to drive the haptic actuator 120 with the drive signal.

Control functionality of the haptic driver 110 (or signal generator thereof) may be implemented as digital or analogue circuitry, in hardware or in software running on a processor, or in any combination of these. Such control functionality may include any system, device, or apparatus configured to interpret and/or execute program instructions or code and/or process data, and may include, without limitation a processor, microprocessor, microcontroller, digital signal processor (DSP), application specific integrated circuit (ASIC), FPGA (Field Programmable Gate Array) or any other digital or analogue circuitry configured to interpret and/or execute program instructions and/or process data. Thus, the code may comprise program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware. Processor control code for execution may be provided on a non-volatile carrier medium such as a disk, CD- or DVD-ROM, programmed memory such as read only memory (Firmware), or on a data carrier such as an optical or electrical signal carrier. The haptic driver 110 or control circuitry thereof may be provided as, or as part of, an integrated circuit such as an IC chip.

The control functionality of the haptic driver 110 may be considered as an audio-haptic effect generation method. Such a method may comprise: generating a haptic drive signal and an audio drive signal, the haptic drive signal for causing the haptic actuator 120 to generate a haptic vibration output and the audio drive signal for causing the haptic actuator 120 to generate an audio output; and driving the haptic actuator 120 with the haptic drive signal and the audio drive signal so that the haptic actuator 120 generates the haptic vibration output and the audio output.

Although not shown in FIG. 1, the host 100 may comprise a further controller separate from the haptic driver 110 but in communication therewith, such as an application processor configured to generally control operation of the host 100. Alternatively, the functionality of such a further controller may be provided by the haptic driver 110. The host 100 may also comprise an input and/or output unit (I/O unit), for interaction with a user and/or with another device, and a memory. The memory may be configured to retain program instructions and/or data for a period of time, e.g. for the haptic driver 110 (and any further controller).

The sensor 130 may be any sensor capable of detecting, for example, the voltage across the haptic actuator 120 and/or the current drawn by the haptic actuator 120. The sensor 130 may in some arrangements be configured to detect the mechanical performance of the haptic actuator 120. For example, the sensor 130 may comprise at least one of: a voltmeter, an ammeter, a resistance, a microphone; an accelerometer, an inertial measurement unit, a motion sensor; a speaker; a piezoelectric sensor; a temperature sensor and a force sensor. In some arrangements, the sensor 130 may be implemented as part of the haptic driver 110. The haptic driver 110 and/or sensor 130 accordingly may comprise monitoring circuitry arranged to monitor and track actuator characteristics, e.g. voltage, current, back EMF, temperature, and/or actuator resonant frequency. The haptic driver 110 may be configured, based on input from the sensor 130, to control or adjust the driving signal based on the monitored characteristics, and/or to control the driving signal using closed-loop control.

As mentioned above, the haptic driver 110 is configured to drive the haptic actuator 120 with the haptic drive signal and the audio drive signal (or the audio-haptic drive signal) to generate the haptic vibration output and the audio output. Where the audio-haptic drive signal is generated by combining (e.g. summing) the haptic drive signal and the audio drive signal, this may involve amplifying and/or buffering either or both of the haptic drive signal and the audio drive signal prior to the combination.

In order to address potential unintended haptic or audio generation, generating the haptic drive signal may comprise filtering to reduce or eliminate generation of an audio output therefrom. Similarly, generating the audio drive signal may comprise filtering to reduce or eliminate generation of a haptic vibration output therefrom. The assumption here is that the haptic drive signal is intended to generate the haptic vibration output and not any, or any noticeable, audio output, and similarly that the audio drive signal is intended to generate the audio output and not any, or any noticeable, haptic vibration output.

For example, generating the haptic drive signal may comprise haptic frequency filtering configured so that the haptic drive signal causes the haptic actuator to generate the haptic vibration output and substantially no audio output. Such haptic frequency filtering may be configured to substantially eliminate or attenuate signal strength in the haptic drive signal at audio-noise-causing frequencies, optionally at frequencies above a haptic cut-off frequency in the range 300 to 700 Hz, or for example at frequencies above 1000 Hz. Haptic frequency filtering may comprise low-pass filtering with a haptic cut-off frequency, or band-pass filtering with the haptic cut-off frequency as its upper cut-off frequency (and a lower cut-off frequency to define a suitable range of haptic frequencies). The haptic cut-off frequency could be in the range 300 to 700 Hz, for example approximately 500 Hz.

Similarly, generating the audio drive signal may comprise audio frequency filtering configured so that the audio drive signal causes the haptic actuator to generate the audio output and substantially no haptic vibration output. Such audio frequency filtering may be configured to substantially eliminate or attenuate signal strength in the audio drive signal at haptic-vibration-causing frequencies, optionally at frequencies at or near the resonant frequency F0 of the haptic actuator 120, and optionally at frequencies below an audio cut-off frequency in the range 800 to 1200 Hz, or for example at frequencies below 700 Hz. Audio frequency filtering may comprise high-pass filtering with an audio cut-off frequency, or band-pass filtering with the audio cut-off frequency as its lower cut-off frequency (and an upper cut-off frequency to define a suitable range of audio frequencies). The audio cut-off frequency could be in the range 800 to 1200 Hz, for example approximately 1 kHz.

The haptic drive signal and/or the audio drive signal could be based on externally received haptic/audio content, and/or generated within the haptic driver 110, for example based on a command signal. This leads to a number of arrangements which may be understood in relation to FIG. 3.

FIG. 3 is a table useful for understanding a number of example arrangements, which may be implemented by the haptic driver 110. Seven example arrangements are respectively numbered A1 to A7.

For each arrangement, it is indicated whether one or more input signals (considered as signals prior to filtering or other signal processing) are received externally or are internally generated, and whether filtering and conversion or other processing is performed.

In each case, it is indicated that component audio and haptic drive signals are generated, and that a combined audio-haptic drive signal is generated based on a combination (e.g. summation) of the audio and haptic drive signals. As mentioned above, however, it may be that separate audio and haptic drive signals are generated, and that these are used to drive the haptic actuator 120 without explicitly combining them to generate the audio-haptic drive signal. Similarly, it may be that the audio-haptic drive signal is generated directly without there being separate audio and haptic drive signals generated within the haptic driver 110. FIG. 3 will therefore be understood to allow for such variations to the arrangements explicitly shown.

Taking arrangement A1 first, the haptic driver 110 may be configured to receive separate audio and haptic input signals from an external source, for example from another controller within the host 100 or from a source external to the host 100. The input audio signal may be subject to audio frequency filtering (shown as HPF, high-pass filtering) and/or the input haptic signal may be subject to haptic frequency filtering (shown as LPF, low-pass filtering). The HPF and LPF filtering are shown in brackets to indicate that in some arrangements the filtering may not be required. It may for example be that either or both of the input audio signal and the input haptic signal are not subject to filtering, depending on how those signals are configured.

In this arrangement, the audio drive signal thus results from the input audio signal and the haptic drive signal from the input haptic signal. As a variation, it may be that the audio and haptic input signals are received as a combined audio-haptic input signal, which is then subject separately to the audio frequency filtering and the haptic frequency filtering.

Figure 4:
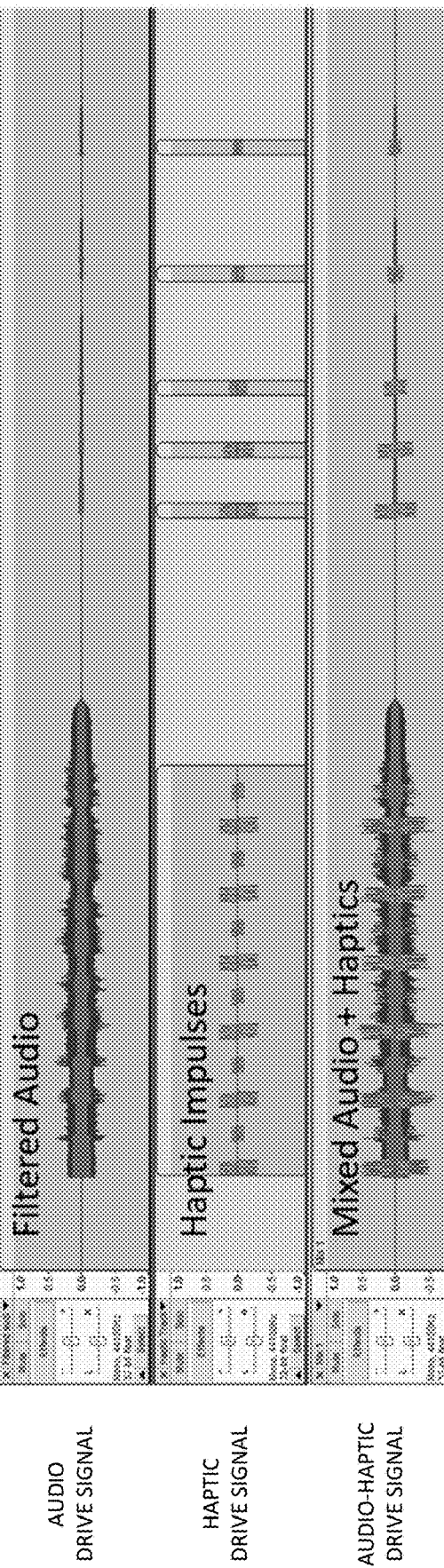
FIG. 4 presents example drive signals corresponding to one of the example arrangements of FIG. 3.

FIG. 4 presents example audio and haptic drive signals, and a combined audio-haptic drive signal, corresponding to arrangement A1. The haptic drive signal for example represents a plurality of haptic impulses. In each case, the x-axis represents time (for example, in ms) and the y-axis represents signal magnitude (for example, in mV). It is assumed here that an audio signal was received in filtered form or was subject to audio frequency filtering within the haptic driver 110, leading to the audio drive signal. It is also assumed that a haptic signal was received in filtered form or was subject to haptic frequency filtering within the haptic driver 110, leading to the haptic drive signal. The audio-haptic drive signal represents a summation of the audio and haptic drive signals.

Returning to FIG. 3, in arrangement A2 the haptic driver 110 may be configured to receive an audio input signal from an external source, for example from another controller within the host 100 or from a source external to the host 100. The audio input signal may be subject to audio frequency filtering (shown as HPF, high-pass filtering), and optionally buffering, thus generating the audio drive signal. The audio input signal may also be subject to haptic frequency filtering (shown as LPF, low-pass filtering), and then to an audio-to-haptic (A2H) conversion process (optionally followed by haptic post-processing), thus generating the haptic drive signal.

Thus, using either pre-processed, or unprocessed audio data (audio input signal), the haptic and audio bands may be separated using appropriate high-pass and low-pass filters (e.g. as described above). The low-pass-filtered audio signal content may be used to generate haptic effects, for example using any known audio-to-haptic (A2H) mechanism. Preferably, the haptic path will generate haptic effects around the resonance frequency of the actuator. For example, the output of the A2H conversion process may be an amplitude-modulated sinusoidal signal, whose dominant frequency is at or near the resonant frequency F0 of the haptic actuator 120. The high-pass-filtered audio can be mixed back in with the haptics signal in real-time, to provide the combined audio-haptic drive signal (audio and haptics) for the actuator 120.

Examples of A2H conversion may include frequency, bandwidth and/or amplitude modulating a carrier signal based on an audio input signal. Example techniques are disclosed in US 2023/0059333 A1, the entire contents of which are incorporated herein by reference. Haptic post-processing may include closed loop control and/or protection to the haptic track. For example, such processing may comprise over-excursion protection, i.e. controlling the haptic drive signal to protect the haptic actuator 120 (vibrational transducer) from over excursion, and that control may be a function of temperature of the haptic actuator 120.

Figure 5:
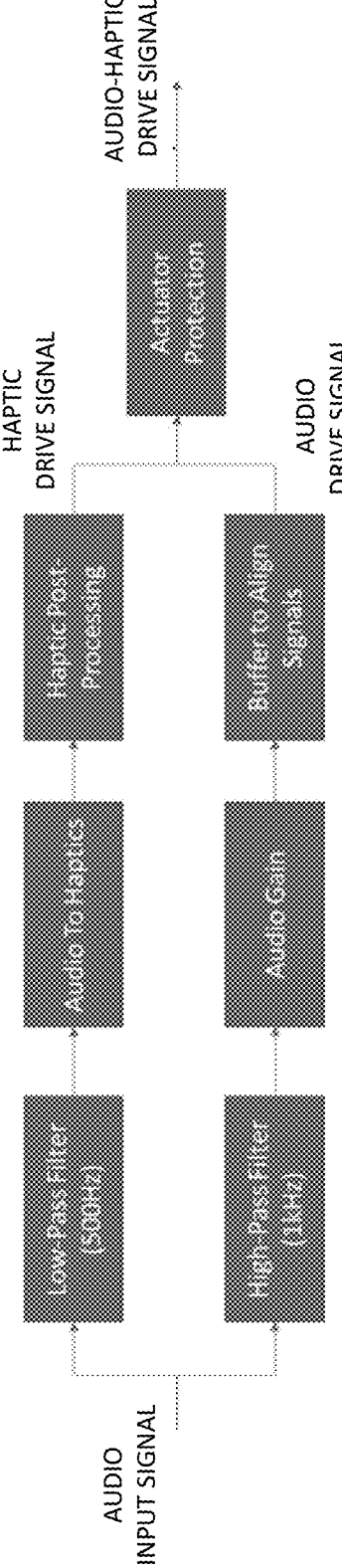
FIG. 5 is a flow diagram showing an example implementation of one of the example arrangements of FIG. 3.

FIG. 5 is a flow diagram showing an example implementation of arrangement A2. An audio input signal is processed in two parallel paths, shown as upper and lower paths.

In the upper path, the audio input signal is subject to audio frequency filtering, in this example to low-pass filtering with a cut-off frequency of 500 Hz. The resultant signal is subject to A2H processing, to generate a haptics signal from the low-frequency content of the input audio signal, and then to haptic post-processing, arriving at the haptic drive signal.

In the lower path, the audio input signal is subject to haptic frequency filtering, in this example to high-pass filtering with a cut-off frequency of 1 kHz. The resultant signal is amplified in an audio gain step (a step of amplification by a gain factor) and then buffered to enable alignment between the resultant audio drive signal and the haptic drive signal.

The haptic drive signal and the audio drive signal are then combined as indicated, and subject to actuator protection, leading to the actual audio-haptic drive signal. Such actuator protection may comprise over-excursion protection as mentioned above.

The haptic-processing, audio gain, buffering and actuator protection steps may be considered optional, indicating that they are application specific and need not be provided in some arrangements. Also, either of the upper and lower paths may be disabled, for example on-the-fly or depending on the mode of operation, leading to only one of the haptic drive signal and the audio drive signal being generated, with a consequential effect on the audio-haptic drive signal.

Returning to FIG. 3, in arrangement A3 the haptic driver 110 may be configured to receive a haptic input signal from an external source, for example from another controller within the host 100 or from a source external to the host 100. The haptic input signal may be subject to haptic frequency filtering (shown as LPF, low-pass filtering), and optionally haptic post-processing, thus generating the haptic drive signal. The haptic input signal may also be subject to audio frequency filtering (shown as HPF, high-pass filtering), and may be subject to a haptic-to-audio (H2A) conversion process, and optionally buffering, thus generating the audio drive signal.

Examples of H2A conversion may include generating a pre-recorded or preconfigured audio signal, or a tone signal pulse, based on detecting features of the filtered or unfiltered haptic signal. As an example, a clearly audible tone (or other sound effect) may be generated for each haptic pulse in the haptic signal. Thus, certain haptic effects may be used to generate an audible tone waveform. As another example, an A2H algorithm as mentioned earlier may trigger a specific pre-designed waveform that is audible.

Arrangements A4 to A6 correspond to arrangements A1 to A3, respectively, except that the audio/haptic input signals are generated internally within the haptic driver 110, optionally based on an externally received command signal. Such a command signal may simply be a trigger for generating or issuing pre-configured content, or may be more sophisticated, providing haptic and/or audio parameters to define the various haptic/audio signals.

Arrangement A7 is similar to arrangement A1, except that the haptic input signal is generated internally, for example based on a received command signal. Alternatively, the haptic input signal may be generated internally using the audio signal, for example as a trigger. Thus, arrangement A7 may be considered similar to arrangement A2, except that the audio signal acts merely as a trigger (e.g. to output a pre-recorded haptic signal) rather than as the input to an A2H process.

Thus, the haptic driver 110 may be configured to generate the haptic drive signal based on (as an input signal) a haptic signal, an audio signal and/or a combined audio-haptic signal, optionally by haptic frequency filtering or low-pass filtering. The haptic signal, audio signal and/or combined audio-haptic signal may be generated by the haptic driver 110, optionally based on a received input signal such as a command signal. The haptic signal, audio signal and/or combined audio-haptic signal may, in other arrangements, be received from an external source.

Similarly, the haptic driver 110 may be configured to generate the audio drive signal based on (as an input signal) an audio signal and/or a combined audio-haptic signal, optionally by audio frequency filtering or high-pass filtering. The audio signal and/or the combined audio-haptic signal, may be generated by the haptic driver 110, optionally based on a received input signal such as a command signal. The audio signal and/or the combined audio-haptic signal may, in other arrangements, be received from an external source.

The haptic drive signal may be generated to have a dominant frequency at or near the resonant frequency F0 of the haptic actuator 120. Generating the haptic drive signal may thus comprise monitoring the resonant frequency F0 of the haptic actuator 120 and adjusting the dominant frequency of the haptic drive signal to compensate for changes in the resonant frequency F0. The haptic drive signal may for example be an amplitude modulated sinusoidal signal or tone signal, for example generated by the A2H processing mentioned above.

Similarly, the audio drive signal may be generated, for example by the H2A processing mentioned above (e.g. to generate pre-stored tones), to have one or more dominant frequencies which are separated from the resonant frequency F0 of the haptic actuator 120. Generating the audio drive signal may thus similarly comprise monitoring the resonant frequency F0 of the haptic actuator 120.

As mentioned above, the haptic driver 110 and/or the sensor 130 may be configured to monitor characteristics of the haptic actuator 120. The haptic drive signal and/or the audio drive signal may then be adjusted/controlled based on the monitored characteristics. Such characteristics may comprise any of a voltage across the haptic actuator 120; a current drawn by the haptic actuator 120; a back EMF of the haptic actuator 120; a temperature of the haptic actuator 120; and the resonant frequency F0 of the haptic actuator.

The filtering mentioned above may be configured to separate audio and haptic frequency content. For example, the haptic frequency filtering and audio frequency filtering may be configured such that signal strength in the haptic drive signal and in the audio drive signal is substantially eliminated or attenuated over a guard frequency band positioned in frequency higher than a resonant frequency of the haptic actuator and optionally lower than 2000 Hz. The guard frequency band may define a frequency range over which it is acceptable to have no haptic content and no audio content. One or both of the limits of the guard frequency band may be defined by a frequency that causes negligible acceleration that a user can feel and/or a frequency that causes negligible audio output that a user can hear. For example, the value 2000 Hz is an example and an upper end in frequency of the guard frequency band may be a frequency below which audio content is deemed unnecessary and below which acceleration that a user can feel begins to occur.

Although the disclosure thus far has considered the driving of a single haptic actuator, the principles apply equally to the driving of a plurality of haptic actuators. Each of a plurality of haptic actuators may output audio and haptic content.

Figure 6A:
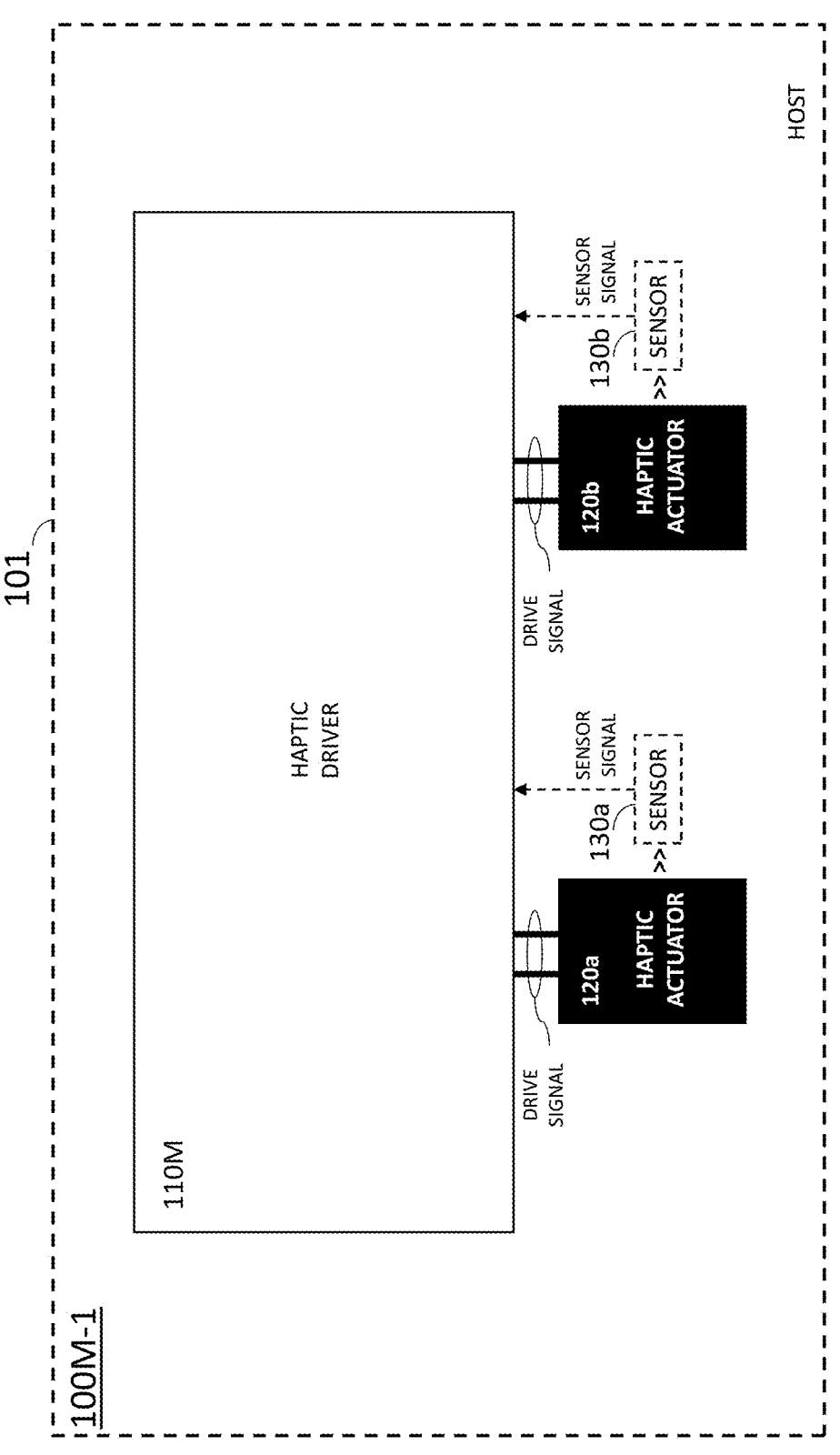
FIGS. 6A and 6B are schematic diagrams of hosts and haptic drivers embodying the present invention.

FIG. 6A is a schematic diagram of a host 100M-1, embodying the present invention. The host 100M-1 is the same as the host 100 except that it comprises a plurality of haptic actuators 120a and 120b and, optionally, a corresponding plurality of sensors 130a and 130b. The haptic driver 110M corresponds to the haptic driver 110 except that it is configured to drive the plurality of haptic actuators 120a and 120b. As such, duplicate description may be omitted.

With reference to FIG. 2, the haptic actuator 120a may be considered a first haptic actuator and correspond to the haptic actuator 120 with the drive signal (first drive signal) of the haptic actuator 120a being the same as that of the haptic actuator 120. The haptic actuator 120b may then be considered a second haptic actuator, with the haptic driver 110M configured to drive the second haptic actuator with a second drive signal. Specifically, the haptic driver 110M may be configured to drive the second haptic actuator 120b with a second drive signal.

Figure 6B:
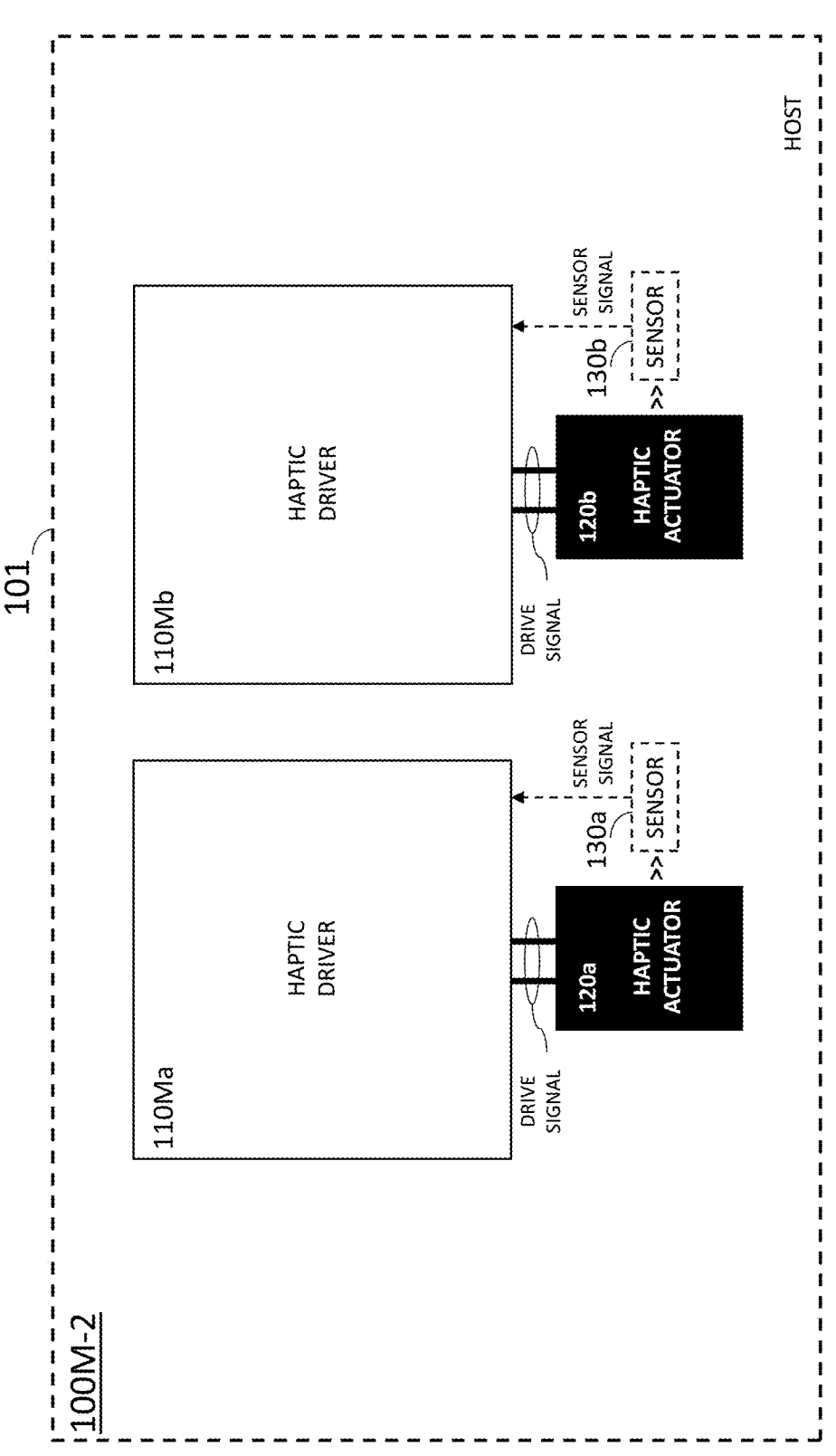

FIG. 6B is a schematic diagram of a host 100M-2, embodying the present invention. The host 100M-2 is the same as the host 100M-1 except that the haptic actuators 120a and 120b are driven by respective haptic drivers 110Ma and 110Mb, each of which corresponds to the haptic driver 110. The haptic driver 110Ma thus generates the first drive signal and the haptic driver 100Mb generates the second drive signal. The combination of the haptic drivers 110Ma and 110Mb corresponds to the haptic driver 100M, and, as such, duplicate description may be omitted.

For example, in the case of a pair of haptic actuators as in FIGS. 6A and 6B, the input signals may be dual channel (e.g., LR, or left-right), the output drive signals may be dual channel (e.g., LR, or left-right), or both the input signals and the output drive signals may be dual channel. Where the input signals are not dual channel but the output drive signals are dual channel, the haptic driver 110M (or haptic drivers 110Ma and 110Mb) may be configured to generate dual channel output drive signals from one or more single channel input signals. Dual-channel output drive signals may enable stereo haptic and/or audio effects. Where such dual-channel output drive signals are produced, the haptic driver/drivers may be configured to synchronize those signals.

The skilled person will recognise that some aspects of the above-described apparatus (circuitry), devices and methods may be embodied as processor control code, for example on a non-volatile carrier medium such as a disk, CD- or DVD-ROM, programmed memory such as read only memory (Firmware), or on a data carrier such as an optical or electrical signal carrier. For example, any of the haptic drivers 110, 110M, 110Ma and 110Mb may be implemented as a processor operating based on processor control code.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element. Further embodiments likewise, with the benefit of this disclosure, will be apparent to those having ordinary skill in the art, and such embodiments should be deemed as being encompassed herein.

To aid the Patent Office (USPTO) and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The present disclosure extends to the following statements:

There is disclosed herein:

1) A method to create haptic tracks on a host processor (haptic driver)

A method of 1) where audio and haptics can be independently designed as to not interfere with each other.

A method of 1) preventing unintended haptic feeling from arbitrary audio data.

2) A method to create haptic effects with Audio To Haptics, while maintaining audio capability A method of 2) creating haptics with Audio To Haptics, but maintaining audio alert capability.

A method of 2) having the ability to apply haptic algorithms such as closed loop control or protection to the haptic track.

A method of 2) maintaining a simple audio stream with no extra work from the user.

3) A method of 1) and/or 2) where multiple actuators are used

A method of 3) where 2 (or more) actuators are used in synchrony for stereo haptic and audio effects.

1. Accordingly, there is provided a system and method for driving a haptic actuator, for example a Voice Coil Actuator (VCA), a Voice Coil Motor (VCM), a Linear Resonant Actuator (LRA), or an Eccentric Rotating Mass (ERM), where the system and method comprises:

Providing a driving signal for a haptic actuator, wherein the driving signal comprises a low frequency component for generating a haptic vibration output using the actuator and a high-frequency component for generating an audio output using the actuator, and Outputting the driving signal to a haptic actuator to generate a haptic output and an audio output using the actuator.

2. In one aspect, preferably the step of providing a driving signal comprises:

Receiving an audio signal and a haptic signal for output;

High-pass filtering the audio signal to provide a filtered audio signal;

Optionally low-pass filtering the haptic signal to provide a filtered haptic signal; and Combining the filtered audio signal and the haptic signal or the filtered haptic signal to provide a combined driving signal for outputting to the actuator.

3. Preferably, the step of high-pass filtering the audio signal comprises filtering the audio signal to eliminate vibration-causing frequencies from the audio signal. Preferably, the highpass filtering is performed having a cut-off frequency of approximately 1 kHz.

4. Preferably, the step of low-pass filtering the haptic signal comprises filtering the haptic signal to eliminate noise-causing frequencies from the haptic signal. Preferably, the low-pass filtering is performed having a cut-off frequency of approximately 500 Hz.

5. In a further aspect, preferably the step of providing a driving signal comprises:

Receiving an audio signal for output;

Generating a haptic signal for output based on the received audio signal; and

Combining the received audio signal and the generated haptic signal to provide the driving signal.

6. Preferably, the step of generating a haptic signal comprises:

Low-pass filtering the received audio signal to provide a low-frequency component audio signal, preferably filtered below 500 Hz; and Generating the haptic signal based on the low-frequency component audio signal.

The generating step may be performed using any suitable audio-to-haptics mechanism, for generating haptics driving signals based on an audio signal. It will be understood that the generated haptic signal may optionally be filtered to remove any noise-causing frequencies from the haptic signal.

7. Preferably, the haptic signal is combined with a high-pass filtered version of the received audio signal, preferably filtered above 1 kHz.

8. Preferably, the audio signal may be amplified and/or buffered prior to combination with the haptic signal.

9. Preferably, the system and method further comprises monitoring at least one characteristic of the haptic actuator, and adjusting one or both of the audio or haptic components of the driving signal based on the monitored characteristic. The monitored characteristics may comprise one or more of the following: voltage, current, Back EMF, temperature, and/or actuator resonant frequency.

10. There is provided an integrated circuit (IC) arranged to implement the above-described system and method.

11. There is further provided an integrated circuit (IC) comprising:

a haptic driver output stage to be coupled with a haptic actuator; and an integrated Digital Signal Processor (DSP) to generate a driving signal to be output by the haptic driver output stage, wherein the DSP receives an input signal and generates a driving signal to be output, the driving signal having an audio component and a haptic component.

12. Preferably, the input signal comprises an audio signal and a haptic signal, or the input signal comprises solely an audio signal, wherein the DSP is operable to generate a driving signal having combined audio and haptic components, as described above. Alternatively, the input signal comprises a combined audio and haptic signal generated by a separate controller or in an offline environment.

13. There is further provided a host device, such as a mobile phone, a laptop, a tablet computer, a gaming controller, a wearable device, or a vehicle interface unit, the host device comprising a haptic actuator and an IC as described above to drive the haptic actuator.

14. Preferably, the haptic actuator comprises a Voice Coil Actuator (VCA), a Voice Coil Motor (VCM), a Linear Resonant Actuator (LRA), or an Eccentric Rotating Mass (ERM).

15. In an alternative aspect, there is provided a controller IC, such as an applications processor (AP), the controller IC to be coupled with a haptic driver IC, wherein the controller IC is arranged to implement the above-described system and method in combination with a separate haptic driver IC.

S1. A haptic driver for driving a haptic actuator, the haptic driver configured to:

provide (or generate) a haptic drive signal and an audio drive signal, the haptic drive signal for causing the haptic actuator to generate a haptic vibration output and the audio drive signal for causing the haptic actuator to generate an audio output; and drive the haptic actuator with the haptic drive signal and the audio drive signal so that the haptic actuator generates the haptic vibration output and the audio output.

S2. The haptic driver of statement S1, wherein the haptic drive signal and the audio drive signal are component parts of an audio-haptic drive signal, and the haptic driver is configured to drive the haptic actuator with the audio-haptic drive signal.

S3. The haptic driver of statement S2, configured to combine the haptic drive signal and the audio drive signal to generate the audio-haptic drive signal.

S4. The haptic driver of statement S3, configured to:

buffer the audio drive signal prior to combination with the haptic drive signal, and/or buffer the haptic drive signal prior to combination with the audio drive signal; and/or amplify the haptic drive signal and/or the audio drive signal prior to generation of the audio-haptic drive signal.

S5. The haptic driver of any of the preceding statements, wherein:

providing the haptic drive signal comprises filtering to reduce or eliminate generation of an audio output from the haptic drive signal; and/or providing the audio drive signal comprises filtering to reduce or eliminate generation of a haptic vibration output from the audio drive signal.

S6. The haptic driver of any of the preceding statements, wherein providing the haptic drive signal comprises:

haptic frequency filtering configured so that the haptic drive signal causes the haptic actuator to generate the haptic vibration output and substantially no audio output; and/or haptic frequency filtering configured to substantially eliminate or attenuate signal strength in the haptic drive signal at audio-noise-causing frequencies, optionally at frequencies above a haptic cut-off frequency in the range 300 to 700 Hz, or at frequencies above 1000 Hz; and/or haptic frequency filtering comprising low-pass filtering with a haptic cut-off frequency, optionally wherein the haptic cut-off frequency is in the range 300 to 700 Hz, and optionally is approximately 500 Hz.

S7. The haptic driver of any of the preceding statements, configured to generate the haptic drive signal based on a haptic signal, an audio signal and/or a combined audio-haptic signal, optionally by haptic frequency filtering or low-pass filtering.

S8. The haptic driver of statement S7, configured to:

generate the haptic signal, audio signal and/or combined audio-haptic signal, optionally based on a received input signal; or receive the haptic signal, audio signal and/or combined audio-haptic signal.

S9. The haptic driver of statement S7 or S8, wherein generating the haptic drive signal comprises, optionally after haptic frequency filtering the audio signal, performing an audio-to-haptics process on the audio signal to generate the haptic signal and optionally then haptic frequency filtering the haptic signal.

S10. The haptic driver of any of the preceding statements, wherein the haptic drive signal has a dominant frequency at or near a resonant frequency of the haptic actuator.

S11. The haptic driver of any of the preceding statements, wherein providing the haptic drive signal comprises:

monitoring a resonant frequency of the haptic actuator; and adjusting a dominant frequency of the haptic drive signal to compensate for changes in the resonant frequency of the haptic actuator.

S12. The haptic driver of any of the preceding statements, wherein the haptic drive signal is an amplitude modulated sinusoidal signal.

S13. The haptic driver of any of the preceding statements, wherein providing the audio drive signal comprises:

audio frequency filtering configured so that the audio drive signal causes the haptic actuator to generate the audio output and substantially no haptic vibration output; and/or audio frequency filtering configured to substantially eliminate or attenuate signal strength in the audio drive signal at haptic-vibration-causing frequencies, optionally at frequencies at or near a resonant frequency of the haptic actuator, and optionally at frequencies below an audio cut-off frequency in the range 800 to 1200 Hz, or at frequencies below 700 Hz; and/or audio frequency filtering comprising high-pass filtering with an audio cut-off frequency, optionally wherein the audio cut-off frequency is in the range 800 to 1200 Hz, and approximately 1 kHz.

S14. The haptic driver of any of the preceding statements, configured to generate the audio drive signal based on an audio signal, a haptic signal and/or a combined audio-haptic signal, optionally by audio frequency filtering or high-pass filtering.

S15. The haptic driver of statement S14, configured to:

generate the audio signal, haptic signal and/or the combined audio-haptic signal, optionally based on a received input signal; or receive the audio signal and/or the combined audio-haptic signal.

S16. The haptic driver of statement S14 or S15, wherein generating the audio drive signal comprises, optionally after audio frequency filtering the haptic signal, performing a haptics-to-audio process on the haptic signal to generate the audio signal and optionally then audio frequency filtering the audio signal.

S17. The haptic driver of any of the preceding statements, wherein providing the haptic drive signal comprises haptic frequency filtering and generating the audio drive signal comprises audio frequency filtering, the haptic frequency filtering and the audio frequency filtering configured such that signal strength in the haptic drive signal and in the audio drive signal is substantially eliminated or attenuated over a guard frequency band, the guard frequency band optionally positioned in frequency higher than a resonant frequency of the haptic actuator and optionally lower than 2000 Hz or a defined frequency below which acceleration that a user can feel begins to occur.

S18. The haptic driver of any of the preceding statements, configured to monitor characteristics of the haptic actuator and adjust the haptic drive signal and/or the audio drive signal based on the monitored characteristics, optionally wherein the monitored characteristics comprise at least one of:

a voltage across the haptic actuator;

a current drawn by the haptic actuator;

a back EMF of the haptic actuator;

a temperature of the haptic actuator; and a resonant frequency of the haptic actuator.

S19. The haptic driver of any of the preceding statements, wherein the haptic drive signal and the audio drive signal are configured to cause the haptic actuator to generate the haptic vibration output and the audio output at the same time and/or at different times.

S20. The haptic driver of any of the preceding statements, wherein:

the haptic vibration output is for detection by human touch; and/or the audio output is for detection by human hearing.

S21. The haptic driver of any of the preceding statements, comprising a digital signal processor and a haptic driver output stage, the digital signal processor operable to generate the haptic drive signal and the audio drive signal, and the haptic driver output stage for coupling the digital signal processor to the haptic actuator to drive the haptic actuator based on the haptic drive signal and the audio drive signal.

S22. The haptic driver of any of the preceding statements, configured for driving a plurality of haptic actuators, wherein:

the providing of the haptic drive signal and the audio drive signal comprises providing a haptic drive signal and an audio drive signal for each of the haptic actuators; and the haptic driver is configured to drive the haptic actuators with their respective haptic drive signals and audio drive signals.

S23. The haptic driver of any of the preceding statements, implemented as:

an integrated circuit, optionally as part or all of an IC chip; or a plurality of integrated circuits in combination.

S24. An integrated circuit, such as an IC chip, comprising the haptic driver of any of the preceding statements.

S25. A haptic system or host device, comprising:

the haptic driver of any of statements S1 to S23; and the haptic actuator or haptic actuators.

S26. The haptic system or host device of statement S25, wherein each haptic actuator is or comprises at least one of:

a linear resonant actuator, LRA;

a voice coil motor, VCM;

a voice coil actuator, VCA; and an eccentric rotating mass motor, ERM.

S27. A haptic system, comprising:

a haptic actuator; and a haptic driver, wherein the haptic driver is configured to:

provide (or generate) a drive signal comprising a haptic component and an audio component, the haptic component for causing the haptic actuator to generate a haptic vibration output and the audio component for causing the haptic actuator to generate an audio output; and drive the haptic actuator with the drive signal so that the haptic actuator generates the haptic vibration output and the audio output.

S28. A haptic system, comprising:

a haptic actuator; and a haptic driver, wherein the haptic driver is configured to:

provide (or generate) an audio-haptic drive signal comprising a haptic drive signal and an audio drive signal, the haptic drive signal for causing the haptic actuator to generate a haptic vibration output and the audio drive signal for causing the haptic actuator to generate an audio output; and drive the haptic actuator with the drive signal so that the haptic actuator generates the haptic vibration output and the audio output.

S29. A haptic system, comprising:

a plurality of haptic actuators; and a haptic driver, wherein the haptic driver is configured to:

for each haptic actuator, provide (or generate) a haptic drive signal and an audio drive signal, the haptic drive signal for causing the haptic actuator to generate a haptic vibration output and the audio drive signal for causing the haptic actuator to generate an audio output; and drive the haptic actuators with their respective haptic drive signals and audio drive signals so that the haptic actuators generate their respective haptic vibration outputs and audio outputs.

S30. The haptic system of statement S29, wherein:

the audio drive signals are configured so that the haptic actuators collectively generate stereo or multi-channel or panning audio outputs; and/or the haptic drive signals are configured so that the haptic actuators collectively generate stereo or multi-channel or panning haptic vibration outputs.

S31. The haptic system of statement S29 or S30, wherein:

the haptic driver comprises a plurality of haptic drivers, each haptic driver of the plurality of haptic drivers for providing (or generating) the haptic drive signal and audio drive signal for a respective haptic actuator of the plurality of haptic actuators.

The invention claimed is:

1. A haptic driver for driving a haptic actuator, the haptic driver configured to:

generate a haptic drive signal by performing an audio-to-haptics process on an audio signal, the haptic drive signal for causing the haptic actuator to generate a haptic vibration output;

generate an audio drive signal based on the audio signal, the audio drive signal for causing the haptic actuator to generate an audio output; and drive the haptic actuator with the haptic drive signal and the audio drive signal so that the haptic actuator generates the haptic vibration output and the audio output;

wherein:

generating the haptic drive signal comprises haptic frequency filtering configured so that the haptic drive signal causes the haptic actuator to generate the haptic vibration output and substantially no audio output; and generating the audio drive signal comprises audio frequency filtering configured so that the audio drive signal causes the haptic actuator to generate the audio output and substantially no haptic vibration output.

2. The haptic driver of claim 1, wherein the haptic drive signal and the audio drive signal are component parts of an audio-haptic drive signal, and the haptic driver is configured to drive the haptic actuator with the audio-haptic drive signal.

3. The haptic driver of claim 2, configured to combine the haptic drive signal and the audio drive signal to generate the audio-haptic drive signal.

4. The haptic driver of claim 1, wherein:

generating the haptic drive signal comprises filtering to reduce or eliminate generation of an audio output from the haptic drive signal; and/or generating the audio drive signal comprises filtering to reduce or eliminate generation of a haptic vibration output from the audio drive signal.

5. The haptic driver of claim 1, wherein the haptic frequency filtering is configured to substantially eliminate or attenuate signal strength in the haptic drive signal at audio-noise-causing frequencies; and/or the haptic frequency filtering comprises low-pass filtering with a haptic cut-off frequency.

6. The haptic driver of claim 1, wherein the haptic drive signal has a dominant frequency at or near a resonant frequency of the haptic actuator.

7. The haptic driver of claim 1, wherein generating the haptic drive signal comprises:

monitoring a resonant frequency of the haptic actuator; and adjusting a dominant frequency of the haptic drive signal to compensate for changes in the resonant frequency of the haptic actuator.

8. The haptic driver of claim 1, wherein the haptic drive signal is an amplitude modulated sinusoidal signal.

9. The haptic driver of claim 1, wherein the audio frequency filtering is configured to substantially eliminate or attenuate signal strength in the audio drive signal at haptic-vibration-causing frequencies; and/or the audio frequency filtering comprises high-pass filtering with an audio cut-off frequency.

10. The haptic driver of claim 1, wherein the haptic frequency filtering and the audio frequency filtering are configured such that signal strength in the haptic drive signal and in the audio drive signal is substantially eliminated or attenuated over a guard frequency band.

11. The haptic driver of claim 1, configured to monitor characteristics of the haptic actuator and adjust the haptic drive signal and/or the audio drive signal based on the monitored characteristics.

12. The haptic driver of claim 1, configured for driving a plurality of haptic actuators, wherein:

the providing of the haptic drive signal and the audio drive signal comprises providing a haptic drive signal and an audio drive signal for each of the haptic actuators; and the haptic driver is configured to drive the haptic actuators with their respective haptic drive signals and audio drive signals.

13. A haptic system, comprising:

a plurality of haptic actuators; and the haptic driver of claim 12.

14. The haptic system of claim 13, wherein:

the audio drive signals are configured so that the haptic actuators collectively generate stereo or multi-channel or panning audio outputs; and/or the haptic drive signals are configured so that the haptic actuators collectively generate stereo or multi-channel or panning haptic vibration outputs.

15. An integrated circuit, such as an IC chip, comprising the haptic driver of claim 1.

16. A haptic system or host device, comprising:

the haptic driver of claim 1; and the haptic actuator or haptic actuators.

\* \* \* \* \*